United States Patent
Huang et al.

(10) Patent No.: US 9,379,820 B2
(45) Date of Patent: Jun. 28, 2016

(54) METHOD AND DEVICE FOR RECEIVING MULTI-CARRIER OPTICAL SIGNAL

(71) Applicant: Huawei Technologies Co., Ltd., Shenzhen (CN)

(72) Inventors: Yuanda Huang, Shenzhen (CN); Liangchuan Li, Shenzhen (CN); Ling Liu, Shenzhen (CN); Lei Liu, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 206 days.

(21) Appl. No.: 13/838,288

(22) Filed: Mar. 15, 2013

(65) Prior Publication Data

US 2013/0209098 A1    Aug. 15, 2013

Related U.S. Application Data

(63) Continuation of application No. PCT/CN2011/077609, filed on Jul. 26, 2011.

(51) Int. Cl.
  *H04B 10/06* (2006.01)
  *H04J 14/00* (2006.01)
  (Continued)

(52) U.S. Cl.
  CPC .......... *H04B 10/60* (2013.01); *H04B 10/6161* (2013.01); *H04B 10/6164* (2013.01); *H04L 27/2657* (2013.01); *H04L 27/2697* (2013.01)

(58) Field of Classification Search
  CPC .................. H04L 27/2657; H04L 27/2697
  See application file for complete search history.

(56) References Cited

U.S. PATENT DOCUMENTS

| 6,005,876 A * | 12/1999 | Cimini, Jr. | ........... H04B 7/0613 370/203 |
| 7,542,504 B2 * | 6/2009 | Chang | .................... H04B 1/713 375/132 |

(Continued)

FOREIGN PATENT DOCUMENTS

| CN | 101110809 A | 1/2008 |
| CN | 101478525 A | 7/2009 |

(Continued)

OTHER PUBLICATIONS

Barbieri et al., "OFDM versus Single-Carrier Transmission for 100 Gbps Optical Communication" Journal of Lightwave Technology, vol. 28, No. 17, Sep. 1, 2010, IEEE 2010, 15 pages.

(Continued)

*Primary Examiner* — Ken N Vanderpuye
*Assistant Examiner* — Amritbir Sandhu
(74) *Attorney, Agent, or Firm* — Brinks Gilson & Lione

(57) ABSTRACT

The present invention relates to a method and a device. The method includes: mixing a multi-carrier optical signal with a local optical signal having the same center frequency as that of the multi-carrier optical signal; performing photoelectric conversion and analog-to-digital conversion on an optical signal obtained through the mixing to obtain a digital signal; performing FFT on the digital signal to obtain a frequency domain signal; grouping the frequency domain signal according to each frequency band corresponding to its respective carrier in the multi-carrier optical signal, and performing IFFT on each frequency domain signal group to obtain a corresponding time domain signal for each carrier; and performing data restoration on each time domain signal corresponding to its respective carrier to obtain data carried on each carrier. The solutions of the present invention only require one set of coherent reception device, and have low cost and low power consumption.

20 Claims, 9 Drawing Sheets

(51) Int. Cl.
*H04J 14/02* (2006.01)
*H04B 10/60* (2013.01)
*H04B 10/61* (2013.01)
*H04L 27/26* (2006.01)

(56) References Cited

U.S. PATENT DOCUMENTS

| | | | | |
|---|---|---|---|---|
| 8,112,001 | B2* | 2/2012 | Lowery | H04B 10/2543 398/158 |
| 8,693,459 | B2* | 4/2014 | Youn | H04B 10/532 370/350 |
| 2005/0074037 | A1 | 4/2005 | Rickard et al. | |
| 2006/0009177 | A1* | 1/2006 | Persico | H04B 1/109 455/143 |
| 2006/0078337 | A1* | 4/2006 | Harley et al. | 398/186 |
| 2009/0028395 | A1 | 1/2009 | Riionheimo | |
| 2009/0232234 | A1* | 9/2009 | Du | H04B 7/2621 375/260 |
| 2009/0245816 | A1* | 10/2009 | Liu | H04B 10/60 398/208 |
| 2009/0274073 | A1* | 11/2009 | Sutton | H04W 4/20 370/280 |
| 2009/0324226 | A1* | 12/2009 | Buchali | H04B 10/548 398/76 |
| 2010/0104284 | A1* | 4/2010 | Liu | H04J 14/06 398/65 |
| 2010/0142952 | A1* | 6/2010 | Qian | H04B 10/2513 398/65 |
| 2010/0178056 | A1 | 7/2010 | Liu | |
| 2010/0329683 | A1* | 12/2010 | Liu | H04B 10/2513 398/81 |
| 2011/0002689 | A1* | 1/2011 | Sano | H04B 10/69 398/44 |
| 2011/0064421 | A1* | 3/2011 | Zhang | H04B 10/6971 398/208 |
| 2011/0090992 | A1* | 4/2011 | Chung | H04L 27/0014 375/340 |
| 2011/0222854 | A1* | 9/2011 | Roberts | H04B 10/532 398/70 |
| 2011/0255879 | A1* | 10/2011 | Xie | H04B 10/2513 398/208 |
| 2013/0058649 | A1* | 3/2013 | Li | H04B 10/2572 398/43 |
| 2014/0199074 | A1* | 7/2014 | Cho | H04B 10/548 398/79 |
| 2015/0381285 | A1* | 12/2015 | Gripp | H04B 10/60 398/202 |

FOREIGN PATENT DOCUMENTS

| | | |
|---|---|---|
| CN | 101686096 A | 3/2010 |
| CN | 101689096 A | 3/2010 |
| EP | 2247012 A1 | 11/2010 |
| KR | 20040020510 A | 3/2004 |
| WO | WO 2011/113097 A2 | 9/2011 |

OTHER PUBLICATIONS

Von Hoyningen-Huene et al., "Constant Envelope Optical OFDM for Improved Nonlinear and Phase Noise Tolerance" Optical Society of America/OFC/NFOEC 2011, 3 pages.

Liu et al., "448-Gb/s Reduced-Guard-Interval CO-OFDM Transmission Over 2000 km of Ultra-Large-Area Fiber and Five 80-GHz-Grid ROADMs" Journal of Lightwave Technology, vol. 29, No. 4, Feb. 15, 2011, 8 pages.

Tang et al., "Fiber Nonlinearity Mitigation in 428-Gb/s Multiband Coherent Optical OFDM Systems" Optical Society of America/OFC/NFOEC 2010, 3 pages.

Zhang et al., "Blind Adaptive Scheme for Joint Frequency Offset and Channel Estimation in OFDM Systems" 2010 $2^{nd}$ International Conference on Signal Processing Systems, IEEE 2010, 5 pages.

International Search Report issued in corresponding PCT Patent Application No. PCT/CN2011/077609, mailed Apr. 5, 2012, 2 pages.

Office Action issued in corresponding Chinese Patent Application No. 201180001683.7, mailed Dec. 11, 2012, 9 pages.

Yi et al., "Tb/s Coherent Optical OFDM Systems Enabled by Optical Frequency Combs" Journal of Lightwave Technology, vol. 28, No. 14, Jul. 15, 2010, 8 pages.

Chandrasekhar et al., "Terabit Superchannels for High Spectral Efficiency Transmission" ECOC 2010, Sep. 19-23, 2010, Torino, Italy, 6 pages.

* cited by examiner

МЕТHOD AND DEVICE FOR RECEIVING MULTI-CARRIER OPTICAL SIGNAL

CROSS-REFERENCE TO RELATED APPLICATIONS

This application is a continuation of International Application No. PCT/CN2011/077609, filed on Jul. 26 2011, which is hereby incorporated by reference in its entirety.

FIELD OF THE INVENTION

The present invention relates to the field of communications, and in particular, to a method and a device for receiving a multi-carrier optical signal.

BACKGROUND OF THE INVENTION

At present, with the increasing transmission rate requirements, the baud rate of optical transmission systems continuously increases, which imposes increasingly higher rate requirements on components. To lower the rate requirements on components, multi-carrier modulation becomes a mainstream solution for optical communication systems. Currently, for multi-carrier modulation systems, a mode of independent and coherent reception of each carrier is commonly adopted in the industry. The independent and coherent reception of each carrier means that an independent set of coherent reception device should be equipped for each carrier, including a mixer, a PD (Photoconductive Detector, photoconductive detector), an ADC (Analog to Digital Converter, analog to digital converter), and a DSP (Digital Signal Processor, digital signal processor) processor.

A first piece of prior art provides a solution for coherent reception of a multi-carrier optical signal, where a multi-carrier optical signal (for example, a wavelength division multiplexed optical signal) is filtered through an optical filter to implement carrier separation, so as to obtain optical carrier signals; then each optical carrier signal is coherently mixed with its respective local optical signal corresponding to the center frequency of the optical carrier signal and is subjected to photoelectric conversion and analog-to-digital conversion, so as to obtain a digital baseband signal; and then digital signal processing is performed on the digital baseband signal, so as to recover an output signal.

A second piece of prior art provides another solution for coherent reception of a multi-carrier optical signal, where a multi-carrier optical signal is split through a power splitter, into multi-carrier optical signals whose number equals to the number of carriers; then each multi-carrier optical signal is coherently mixed with a local optical signal corresponding to the center frequency of its respective carrier, and is subjected to photoelectric conversion, so as to obtain an analog electrical signal containing information of the carriers, and the analog electrical signal is filtered to implement carrier separation, so as to obtain a carrier signal corresponding to the center frequency; and then, analog-to-digital conversion is performed on the carrier signal to obtain a digital baseband signal, and digital signal processing is performed on the digital baseband signal, so as to recover an output signal.

However, in the first piece of prior art, after the optical filter is used to filter the multi-carrier optical signal to implement carrier separation, an independent set of coherent reception device is required for each optical carrier signal while receiving the optical carrier signal. In the second piece of prior art, after the power splitter is used to split the multi-carrier signal into multiple multi-carrier signals, an independent set of coherent reception device is also required for each multi-carrier signal while receiving the multi-carrier signal, and different from the first piece of prior art, carrier separation is implemented by filtering the electrical signal. It can be seen from the above that, both the solution for receiving a multi-carrier optical signal in the first piece of prior art and the solution for receiving a multi-carrier optical signal in the second piece of prior art require multiple independent sets of coherent reception devices, and therefore, the solutions for receiving a multi-carrier optical signal in prior art have problems of high cost and high power consumption.

SUMMARY OF THE INVENTION

In view of the problems of prior art, the present invention provides a solution for receiving a multi-carrier optical signal, which has advantages of low cost and low power consumption.

In one aspect, the present invention provides a method for receiving a multi-carrier optical signal, which includes:

mixing a multi-carrier optical signal with a local optical signal having a same center frequency as the center frequency of the multi-carrier optical signal;

performing photoelectric conversion and analog-to-digital conversion in succession on an optical signal obtained through the mixing, to obtain a digital signal;

performing fast Fourier transform FFT on the digital signal to obtain a frequency domain signal;

grouping the frequency domain signal according to each frequency band corresponding to its respective carrier in the multi-carrier optical signal, and performing inverse fast Fourier transform IFFT on each frequency domain signal group obtained through the grouping, to obtain a corresponding time domain signal for each carrier; and performing data restoration on each time domain signal corresponding to its respective carrier to obtain data carried on each carrier.

In another aspect, the present invention provides a device for receiving a multi-carrier optical signal, which includes:

a mixer, configured to receive a multi-carrier optical signal and a local optical signal having the same center frequency as the center frequency of the multi-carrier optical signal, and mix the multi-carrier optical signal with the local optical signal;

a photoelectric conversion module, configured to perform photoelectric conversion on an optical signal output by the mixer to obtain an electrical signal;

an analog-to-digital conversion module, configured to perform analog-to-digital conversion on the electrical signal to obtain a digital signal;

a fast Fourier transform FFT module, configured to perform FFT processing on the digital signal to obtain a frequency domain signal;

an inverse fast Fourier transform IFFT module, configured to group the frequency domain signal according to each frequency band corresponding to its respective carrier in the multi-carrier optical signal, and perform IFFT processing on each frequency domain signal group obtained through the grouping to obtain a corresponding time domain signal for each carrier; and a data restoration module, configured to perform data restoration on each time domain signal corresponding to its respective carrier to obtain data carried on each carrier.

Through the solutions for receiving a multi-carrier optical signal provided in the embodiments of the present invention, the multi-carrier optical signal is mixed with the local optical signal having the same center frequency as the center frequency of the multi-carrier optical signal, the signal obtained through the mixing is subjected to photoelectric conversion and analog-to-digital conversion processing in succession, the digital signal obtained through analog-to-digital conversion is subjected to FFT processing, the signal obtained through FFT processing is grouped, and each group is subjected to IFFT processing, so as to implement carrier separation, and finally data carried on each carrier is restored based on each time domain signal corresponding to its respective carrier. It can be seen from the above that, the solutions for receiving a multi-carrier optical signal provided in the embodiments of the present invention only require one set of coherent reception device, therefore the receiving solutions have low cost and low power consumption and are easy to implement; furthermore, all the processing after analog-to-digital conversion may be completed inside one component (for example, DSP), which facilitates the sharing and exchange of channel information and parameters between the carriers, thereby reducing the complexity of receiving the multi-carrier optical signal.

BRIEF DESCRIPTION OF THE DRAWINGS

To illustrate the technical solutions in the embodiments of the present invention or in the prior art more clearly, the accompanying drawings required for describing the embodiments or the prior art are introduced in the following briefly. Apparently, the accompanying drawings in the following descriptions merely show some of the embodiments of the present invention, and persons of ordinary skill in the art can obtain other drawings according to the accompanying drawings without creative efforts.

DETAILED DESCRIPTION OF THE EMBODIMENTS

The technical solutions of embodiments of the present invention will be clearly and completely described in the following with reference to the accompanying drawings of the embodiments of the present invention. It is obvious that the embodiments to be described are only a part rather than all of the embodiments of the present invention. All other embodiments obtained by persons of ordinary skill in the art based on the embodiments of the present invention without creative efforts shall fall within the protection scope of the present invention.

In order to make the objectives, technical solutions and advantages of the present invention clearer, the embodiments of the present invention are described in detail in the following with reference to the accompanying drawings.

Figure 1:
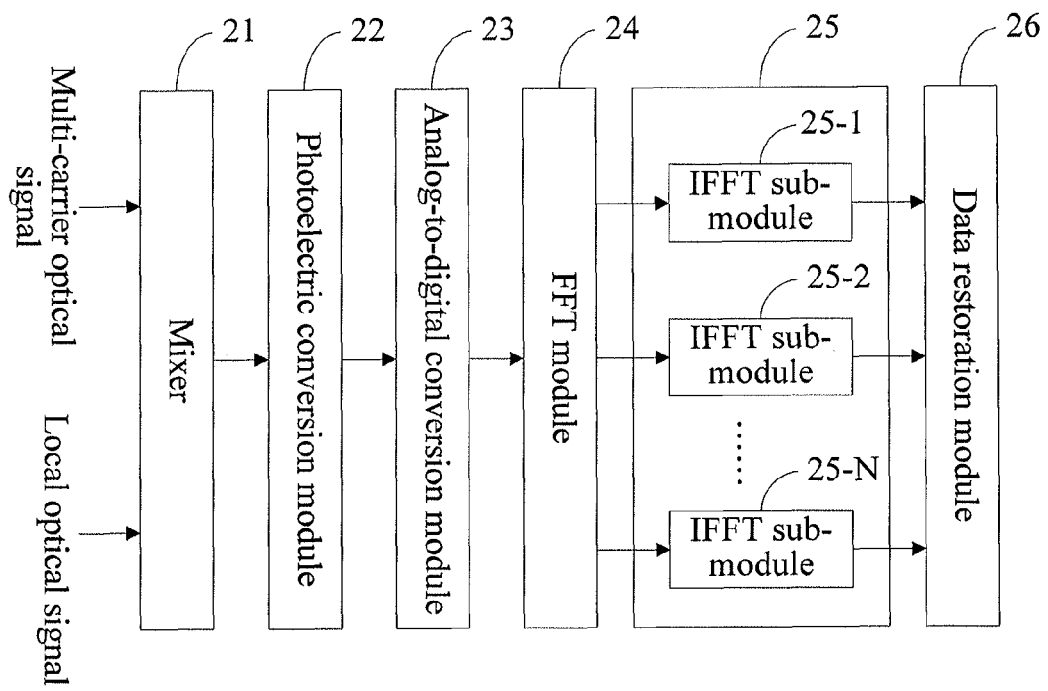
FIG. 1 is a structural diagram of a device for receiving a multi-carrier optical signal provided in Embodiment 1 of the present invention.

An embodiment of the present invention provides a device for receiving a multi-carrier optical signal, with its structure shown in FIG. 1. The device includes a mixer 21, a photoelectric conversion module 22, an analog-to-digital conversion module 23, an FFT (Fast Fourier Transform, fast Fourier transform) module 24, an IFFT (Inverse Fast Fourier Transform, inverse fast Fourier transform) module 25, and a data restoration module 26.

The mixer 25 is configured to receive a multi-carrier optical signal and a local optical signal having the same center frequency as that of the multi-carrier optical signal, and mix the multi-carrier optical signal with the local optical signal. In the present invention, a dual-carrier optical signal having two carriers also belongs to the multi-carrier optical signal described in the present invention, and the modulation mode corresponding to one carrier in the multi-carrier optical signal may be different from the modulation mode corresponding to another carrier.

For ease of description, "N-carrier optical signal" is described as a substitute of "multi-carrier optical signal", where N≥2. The center frequencies of the N carriers in the N-carrier optical signal are f1, f2, . . . , and fN, and the center frequency fS0 of the N-carrier optical signal is (f1+f2+ . . . +fN)/N. In the embodiment of the present invention, the center frequency f0 of the local optical signal is specifically the center frequency fS0 of the N-carrier optical signal. However, in some actual applications, the center frequency f0 of the local optical signal that may be adopted is not completely equal to fS0, but slightly deviates from fS0, or changes around fS0. It can be understood that, the present invention can also be implemented by adopting the local optical signal having the center frequency in the above cases, and therefore, even when the center frequency of the local optical signal slightly deviates from fS0 or changes around fS0, the center frequency of the local optical signal should also be considered as the center frequency of the N-carrier optical signal.

The photoelectric conversion module 22 is configured to perform photoelectric conversion on an optical signal output by the mixer to obtain an electrical signal. The function of the photoelectric conversion module 22 may be implemented by adopting one or more photoconductive detectors.

The analog-to-digital conversion module 23 is configured to perform analog-to-digital conversion on the electrical signal to obtain a digital signal. The function of the analog-to-digital conversion module 23 may be implemented by adopting one or more ADCs.

The fast Fourier transform FFT module 24 is configured to perform FFT processing on the digital signal to obtain a frequency domain signal.

The inverse fast Fourier transform IFFT module 25 is configured to group the frequency domain signal according to each frequency band corresponding to its respective carrier in the multi-carrier optical signal, and perform IFFT processing on each frequency domain signal group obtained through the grouping to obtain a corresponding time domain signal for each carrier. Each carrier of the multi-carrier optical signal occupies a frequency band, the signal before the FFT processing is the time domain representation of the multi-carrier optical signal, the frequency domain signal obtained through the FFT processing is the frequency domain representation of the multi-carrier optical signal, and the frequency domain signal is formed by discrete frequency points As the frequency band occupied by each carrier corresponds to a part of frequency points in the frequency domain signal, the frequency domain signal may be grouped based on each frequency band corresponding to its respective carrier, and the grouping method is: performing grouping with respect to a specific carrier, to take all frequency points corresponding to the frequency band occupied by the carrier in the frequency domain signal as a group. Then, each frequency domain signal group obtained through the grouping separately undergoes IFFT processing, in this way obtaining a corresponding time domain signal for each of the N carriers, that is, carrier separation is implemented. In this embodiment, the FFT module 25 may include FFT sub-modules (25-1, 25-2, . . . , 25-N) of the same quantity as the quantity of carriers in the multi-carrier optical signal. In this embodiment, although it is mentioned that the IFFT module groups the frequency domain signal obtained through FFT transform, the grouping may be construed as that each IFFT sub-module selects all frequency points that correspond to one carrier.

The data restoration module 26 is configured to perform data restoration on each time domain signal corresponding to its respective carrier to obtain data carried on each carrier.

In an embodiment, the data restoration module 26 may further include a clock recovery module, a decision module, and a carrier synchronization module.

The clock recovery module performs clock recovery on the time domain signals corresponding to the N carriers that are output by the IFFT module 25. In actual applications, an actual sampling clock based on which an ADC performs analog-to-digital conversion deviates from an expected sampling clock in terms of sampling phase, and clock recovery processing is to extract error information of sampling phase, and to perform interpolation processing on the signal according to the extracted error information of sampling phase, or to control the sampling clock which is the basis of the ADC by feeding back the error information of sampling phase, thereby eliminating the influence caused by phase deviation.

The carrier synchronization module performs carrier synchronization processing on the time domain signals corresponding to the N carriers obtained through the clock recovery processing. During the carrier synchronization processing, a corresponding frequency deviation and a corresponding phase deviation for each carrier may be estimated, and then corresponding compensation is performed based on the estimated frequency deviation and phase deviation, thereby eliminating the influence caused by the frequency deviation and phase deviation between a sent carrier and a received carrier. The carrier synchronization processing may adopt the prior art, and details will not be described herein again.

The decision module makes a decision on the time domain signals corresponding to the N carriers obtained through the carrier synchronization processing, to obtain data carried on the N carriers. When performing decision processing, the decision module may specifically adopt hard decision or soft decision, which is not specifically limited in the present invention. Both hard decision and soft decision belong to the prior art, and details will not be described in the present invention again.

If the multi-carrier optical signal is specifically a multi-carrier polarization multiplexed optical signal, the data restoration module 26 may further include a PMD (Polarization Mode Dispersion, polarization mode dispersion) compensation module, configured to perform PMD compensation on the time domain signals corresponding to the N carriers obtained through the clock recovery processing, before that are input to the carrier synchronization module.

In another embodiment, the device for receiving a multi-carrier optical signal provided in the embodiment of the present invention may further include a CD (Chromatic Dispersion, chromatic dispersion) compensation module. The CD module may be located before the IFFT module 25, and performs CD compensation on the frequency domain signal before the frequency domain signal is input to the IFFT module 25. The CD compensation module may also be located after the IFFT module 25, and performs CD compensation on each time domain signal corresponding to its respective carrier in the N carriers that is output by the IFFT module 25. In many actual cases, the carriers in the multi-carrier optical signal are transmitted through the same path, and accordingly CD values corresponding to the carriers are approximately the same, so that during CD compensation, CD undergone by each carrier in the multi-carrier optical signal may be compensated based on the CD value corresponding to one of the carriers, or CD undergone by each carrier in the multi-carrier optical signal may be compensated based on the CD value corresponding to its respective carrier. The CD compensation module in the embodiment of the present invention may select any one of the above compensation solutions to compensate for the CD undergone by each carrier. During CD compensation, a CD compensation value needs to be determined first, where one method is to preset a CD compensation value. Since an optical fiber transmission system is slightly influenced by external factors once established, approximately, it may be considered that the CD undergone by a signal during the transmission in the optical fiber transmission system does not change with time. Thus, after the optical fiber transmission system is established, a CD value of each optical carrier signal may be measured during initial testing or system initialization, and then the result(s) of measurement be used as a basis for the system to perform CD compensation during normal operation.

In addition to the manner of determining the CD compensation value by presetting as described above, the CD value of the multi-carrier optical signal may also be monitored in real time, and then the CD value obtained by real-time monitoring may be used as the CD compensation value. Based on this manner of determining the CD compensation value, the device for receiving a multi-carrier optical signal provided in the embodiment of the present invention may further include a first CD estimation module, a second CD estimation module, a third CD estimation module, a fourth CD estimation module, or a fifth CD estimation module.

The first CD estimation module is configured to estimate a CD value based on the time domain signal corresponding to an arbitrary carrier in the N carriers, and provide the estimated CD value to the CD compensation module as a CD compensation value. The CD compensation module performs CD compensation according to the CD compensation value provided by the first CD estimation module.

The second CD estimation module is configured to jointly estimate a CD value based on the time domain signals corresponding to at least two carriers in the N carriers, and provide the jointly estimated CD value to the CD compensation module as a CD compensation value. The CD compensation module performs CD compensation according to the CD compensation value provided by the second CD estimation module.

The third CD estimation module is configured to estimate based on each time domain signal corresponding to its respective carrier, a CD value to obtain a corresponding CD value for each carrier, and provide the CD values corresponding to their respective carriers to the CD compensation module. The CD compensation module performs CD compensation according to the CD values corresponding to their respective carriers provided by the third CD estimation module.

The fourth CD estimation module is configured to estimate a CD value corresponding to an arbitrary carrier based on the frequency domain signal output by the FFT module 24, and provide the estimated CD value to the CD compensation module. The CD compensation module performs CD compensation based on the CD value estimated by the fourth CD estimation module. In the foregoing description, as each carrier corresponds to a part of frequency points in the frequency domain signal, the fourth CD estimation module may estimate a CD value corresponding to an arbitrary carrier based on all frequency points corresponding to the carrier.

The fifth CD estimation module is configured to estimate a corresponding CD value for each carrier based on the frequency domain signal output by the FFT module 24, and provide each CD value corresponding to its respective carrier to the CD compensation module. The CD compensation module performs CD compensation based on each CD value corresponding to its respective carrier that is estimated by the fifth CD estimation module. In the foregoing description, as each carrier is corresponding to a part of frequency points in the frequency domain signal, the fifth CD estimation module may estimate a corresponding CD value for each carrier based on all frequency points corresponding to such carrier.

In another embodiment, the device for receiving a multi-carrier optical signal provided in the embodiment of the present invention may further include a frequency deviation acquiring module and a frequency deviation compensation module.

The frequency deviation acquiring module is configured to acquire a corresponding frequency deviation value for each carrier that is obtained when the carrier synchronization module performs the carrier synchronization processing, calculate a frequency deviation compensation value based on the acquired frequency deviation values corresponding to their respective carriers, and provide the frequency deviation compensation value to the frequency deviation compensation module. For example, if the frequency deviation values corresponding to the N carriers are $\Delta\omega_1, \Delta\omega_2, \ldots$, and $\Delta\omega_N$, the frequency deviation compensation value may be $(\Delta\omega_1 + \Delta\omega_2 + \ldots + \Delta\omega_N)/N$.

The frequency deviation compensation module is configured to perform, based on the frequency deviation compensation value, frequency deviation compensation on the digital signal, before the digital signal obtained through analog-to-digital conversion is input to the FFT module 24.

Alternatively, the frequency deviation compensation module is located after the FFT module 25, and is configured to perform, based on the frequency deviation compensation value, frequency deviation compensation on the frequency domain signal before the frequency domain signal is input to the IFFT module.

The frequency deviation compensation module may implement frequency deviation compensation by performing corresponding frequency shift on the signal based on the frequency deviation compensation value. In addition to the above frequency deviation compensation manner, the frequency deviation compensation value calculated by the frequency deviation acquiring module may also be fed back to a device that generates a local optical signal, so that the device that generates a local optical signal adjusts the center frequency of the local optical signal generated by the device.

In a specific embodiment, the functions of the FFT module 24, the IFFT module 25 and the data restoration module 26 in the embodiment of the present invention may be implemented through a DSP processor, and it can be understood that, in addition to the above three modules, the functions of the CD compensation module, the frequency deviation compensation module, the first CD estimation module, the second CD estimation module, the third CD estimation module, the fourth CD estimation module and the frequency deviation acquiring module may all be implemented through a DSP processor. It should be noted that, in addition to the use of the DSP processor to implement the functions of the above modules, the functions of the above modules may also be implemented by adopting other components, which is not limited in the present invention.

A device for receiving a dual-carrier polarization multiplexed QAM (Quadrature Amplitude Modulation, quadrature amplitude modulation) signal is taken as an example below to further illustrate the solutions of the present invention. For ease of description hereinafter, it is assumed that center frequencies of two carriers (carrier 1, carrier 2) of the dual-carrier polarization multiplexed QAM signal are f1 and f2, respectively.

Figure 2A:
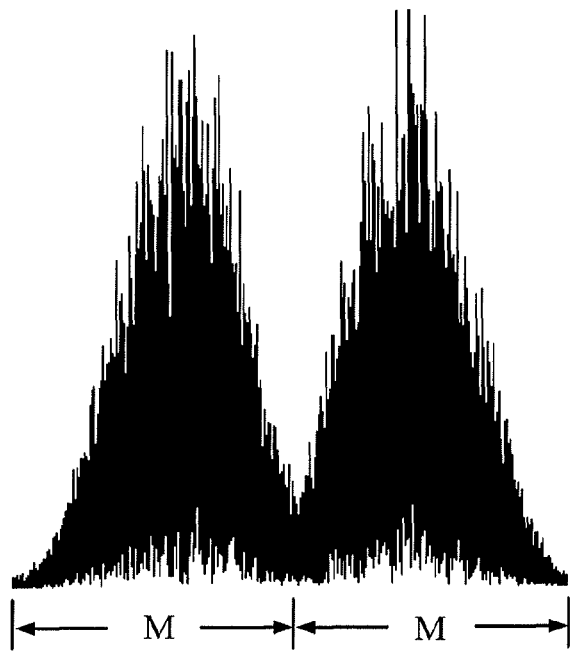
FIG. 2A is a schematic diagram of a frequency domain signal obtained by FFT processing in Embodiment 2 of the present invention.
Figure 2B:
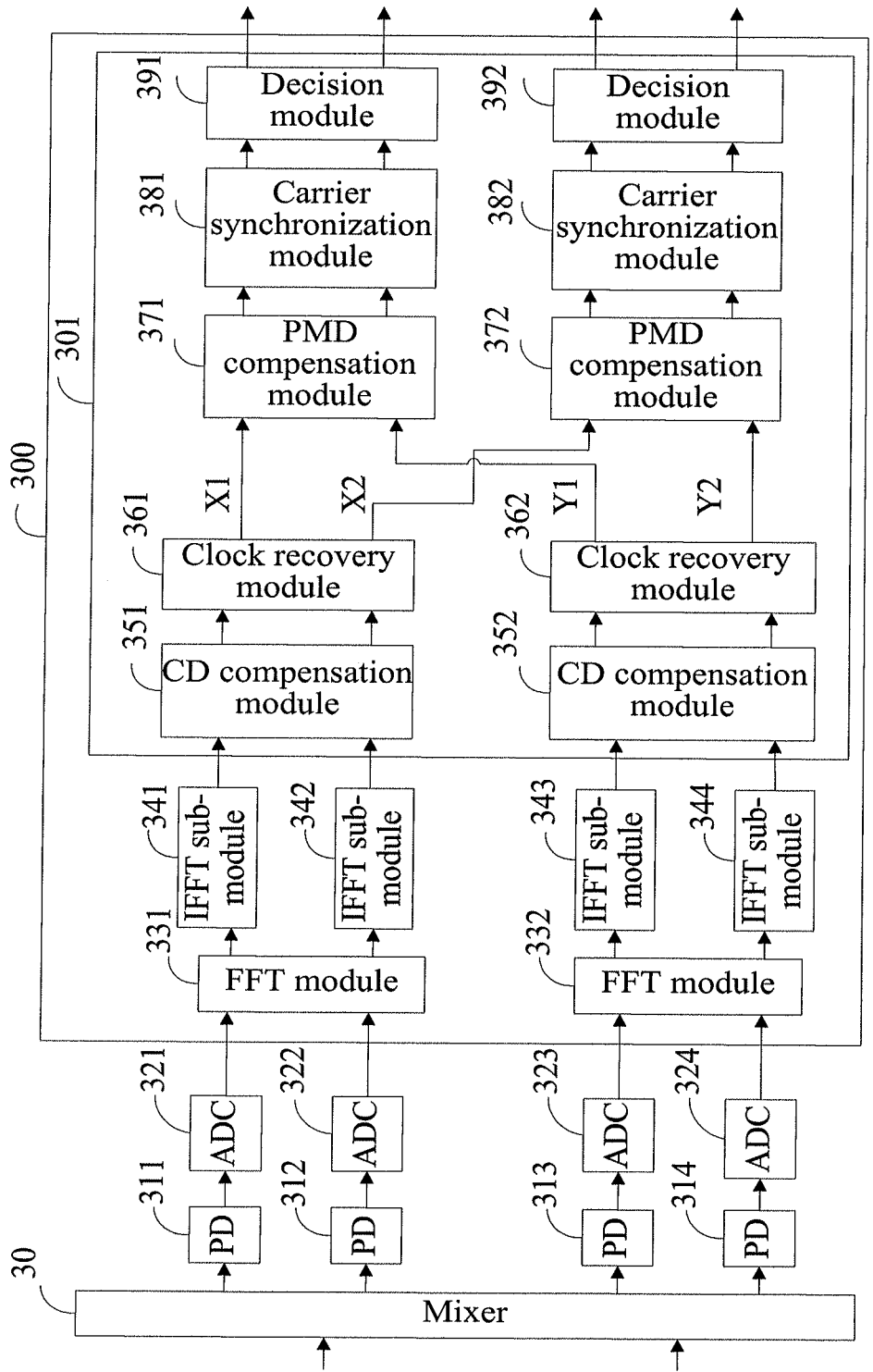
FIG. 2B is a first schematic structural diagram of a device for receiving a multi-carrier optical signal provided in Embodiment 2 of the present invention.

FIG. 2B is a structural diagram of a device for receiving the dual-carrier polarization multiplexed QAM signal. The receiving device includes a mixer 30, a PD 311, a PD 312, a PD 313, a PD 314, an ADC 321, an ADC 322, an ADC 323, an ADC 324, an FFT module 331, an FFT module 332, an IFFT sub-module 341, an IFFT sub-module 342, an IFFT sub-module 343, an IFFT sub-module 344, and a data restoration module 301.

The mixer 30 receives a dual-carrier polarization multiplexed QAM signal and a local optical signal, and mixes the dual-carrier polarization multiplexed QAM signal with the local optical signal. The center frequency of the local optical signal is $(f_1+f_2)/2$.

The PD 311, the PD 312, the PD 313, and the PD 314 each perform photoelectric conversion on two optical signals corresponding to an X-polarized state and two optical signals corresponding to a Y-polarized state to obtain an I-channel electrical signal corresponding to the X-polarized state, a Q-channel electrical signal corresponding to the X-polarized state, an I-channel electrical signal corresponding to the Y-polarized state, and a Q-channel electrical signal corresponding to the Y-polarized state, where two optical signals corresponding to an X-polarized state and two optical signals corresponding to a Y-polarized state are output by the mixer 30. The X-polarized state and the Y-polarized state are two polarized states orthogonal to each other, the I-channel electrical signal corresponding to the X-polarized state and the Q-channel electrical signal corresponding to the X-polarized state jointly represent information on an X-polarized state optical signal in the dual-carrier polarization multiplexed QAM signal, and the I-channel electrical signal corresponding to the Y-polarized state and the Q-channel electrical signal corresponding to the Y-polarized state jointly represent information on a Y-polarized state optical signal in the dual-carrier polarization multiplexed QAM signal.

The ADC 321, the ADC 322, the ADC 323, and the ADC 324 each convert the I-channel electrical signal corresponding to the X-polarized state, the Q-channel electrical signal corresponding to the X-polarized state, the I-channel electrical signal corresponding to the Y-polarized state, and the Q-channel electrical signal corresponding to the Y-polarized state into digital signals, to obtain an I-channel digital signal XI corresponding to the X-polarized state, a Q-channel digital signal XQ corresponding to the X-polarized state, an I-channel digital signal YI corresponding to the Y-polarized state, and a Q-channel digital signal YQ corresponding to the Y-polarized state. XI and XQ jointly represent, in the form of digital signals, information on the X-polarized state optical signal in the dual-carrier polarization multiplexed QAM signal, and YI and YQ jointly represent, in the form of digital signals, information on the Y-polarized state optical signal in the dual-carrier polarization multiplexed QAM signal.

The FFT module 331 performs 2M-point FFT processing on the digital signals representing the information on the X-polarized state optical signal in the dual-carrier polarization multiplexed QAM signal, to obtain a frequency domain signal having 2M frequency points, where the frequency domain signal is referred to as a frequency domain signal corresponding to the X-polarized state and has a frequency spectral shape shown in FIG. 2A; the FFT module 332 performs 2M-point FFT processing on the digital signals representing the information on the Y-polarized state optical signal in the dual-carrier polarization multiplexed QAM signal, to obtain a frequency domain signal having 2M frequency points, where the frequency domain signal is referred to as a frequency domain signal corresponding to the Y-polarized state and has a frequency spectral shape similar to the frequency spectral shape of the frequency domain signal corresponding to the X-polarized state. In FIG. 2A, the frequency domain signal represented by the first M frequency points are corresponding to a carrier 1 in the X-polarized state, and the frequency domain signal represented by the last M frequency points are corresponding to a carrier 2 in the X-polarized state.

The IFFT sub-modules 341 and 342 each perform M-point IFFT processing. Without loss of generality, it is assumed that the IFFT sub-module 341 performs M-point IFFT processing on the frequency domain signal (for example, the frequency domain signal represented by the first M frequency points in FIG. 2A) corresponding to the carrier 1 in the X-polarized state, and the IFFT sub-module 342 performs M-point IFFT processing on the frequency domain signal (for example, the frequency domain signal represented by the last M frequency points in FIG. 2A) corresponding to the carrier 2 in the X-polarized state. The IFFT sub-module 341 outputs time domain signals corresponding to the carrier 1 in the X-polarized state, and the IFFT sub-module 342 outputs time domain signals corresponding to the carrier 2 in the X-polarized state. It should be noted that, the quantity of frequency points corresponding to each carrier is determined by the frequency band corresponding to the carrier, and the quantity of frequency points corresponding to one carrier may not be equal to the quantity of frequency points corresponding to another carrier.

The IFFT sub-modules 343 and 344 each perform M-point IFFT processing. Without loss of generality, it is assumed that the IFFT sub-module 343 performs M-point IFFT processing on the frequency domain signal corresponding to a carrier 1 in the Y-polarized state, and the IFFT sub-module 344 performs M-point IFFT processing on the frequency domain signal corresponding to a carrier 2 in the Y-polarized state. The IFFT sub-module 343 outputs time domain signals corresponding to the carrier 1 in the Y-polarized state, and the IFFT sub-module 344 outputs time domain signals corresponding to the carrier 2 in the Y-polarized state.

Then, the data restoration module 301 performs data restoration on the time domain signals corresponding to the carrier 1 in the X-polarized state, the time domain signals corresponding to the carrier 2 in the X-polarized state, the time domain signals corresponding to the carrier 1 in the Y-polarized state, and the time domain signals corresponding to the carrier 2 in the Y-polarized state, to obtain data carried on the carrier 1 and data carried on the carrier 2.

In this embodiment, the data restoration module 301 may specifically include a CD compensation module 351, a CD compensation module 352, a clock recovery module 361, a clock recovery module 362, a PMD compensation module 371, a PMD compensation module 372, a carrier synchronization module 381, a carrier synchronization module 382, a decision module 391, and a decision module 392.

The CD compensation module 351 is configured to perform CD compensation on the time domain signals corresponding to the carrier 1 in the X-polarized state, and the time domain signals corresponding to the carrier 2 in the X-polarized state. The CD compensation module 352 is configured to perform CD compensation on the time domain signals corresponding to the carrier 1 in the Y-polarized state, and the time domain signals corresponding to the carrier 2 in the Y-polarized state.

The clock recovery module 361 is configured to perform clock timing synchronization processing on the time domain signals corresponding to the carrier 1 in the X-polarized state after the CD compensation and the time domain signals corresponding to the carrier 2 in the X-polarized state after the CD compensation, and output signals X1 and X2, where X1 corresponds to the carrier 1 in the X-polarized state, and X2 corresponds to the carrier 2 in the X-polarized state. The clock recovery module 362 is configured to perform clock timing synchronization processing on the time domain signals corresponding to the carrier 1 in the Y-polarized state after the CD compensation and the time domain signals corresponding to the carrier 2 in the Y-polarized state after the CD compensation, and output signals Y1 and Y2, where Y1 corresponds to the carrier 1 in the Y-polarized state, and Y2 corresponds to the carrier 2 in the Y-polarized state.

The PMD compensation module 371 receives X1 output by the clock recovery module 361 and Y1 output by the clock recovery module 362, and performs PMD compensation on X1 and Y1. The PMD compensation module 372 receives X2 output by the clock recovery module 361 and Y2 output by the clock recovery module 362, and performs PMD compensation on X2 and Y2.

The carrier synchronization module 381 performs carrier synchronization processing on the time domain signals corresponding to the carrier 1 in the X-polarized state after the PMD compensation, and the time domain signals corresponding to the carrier 1 in the Y-polarized state after the PMD compensation. The carrier synchronization module 382 performs carrier synchronization processing on the time domain signals corresponding to the carrier 2 in the X-polarized state after the PMD compensation, and the time domain signals corresponding to the carrier 2 in the Y-polarized state after the PMD compensation.

The decision module 391 makes a decision on signals output by the carrier synchronization module 381, to obtain data carried on the carrier 1. The decision module 392 makes a decision on signals output by the carrier synchronization module 382, to obtain data carried on the carrier 2.

In this embodiment, the FFT module 331, the FFT module 332, the IFFT sub-module 341, the IFFT sub-module 342, the IFFT sub-module 343, the IFFT sub-module 344 and the data restoration module 301 may all be implemented inside a DSP processor 300. It can be understood that, the DSP processor 300 is a part of the receiving device provided in this embodiment.

Figure 2C:
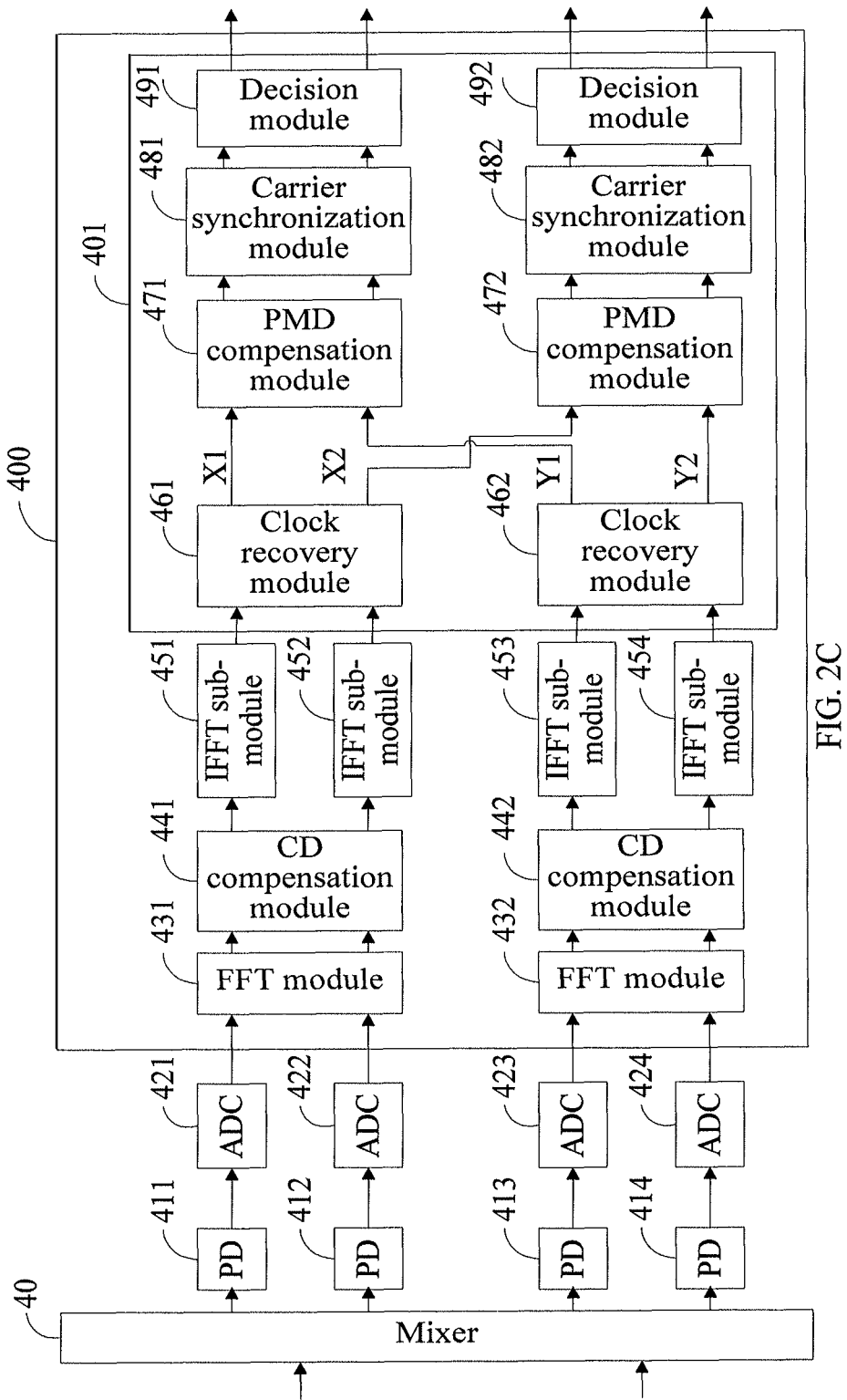
FIG. 2C is a second schematic structural diagram of a device for receiving a multi-carrier optical signal provided in Embodiment 2 of the present invention.

FIG. 2C is another structural diagram of a device for receiving a dual-carrier polarization multiplexed QAM signal. The receiving device includes a mixer 40, a PD 411, a PD 412, a PD 413, a PD 414, an ADC 421, an ADC 422, an ADC 423, an ADC 424, an FFT module 431, an FFT module 432, a CD compensation module 441, a CD compensation module 442, an IFFT sub-module 451, an IFFT sub-module 452, an IFFT sub-module 453, an IFFT sub-module 454, and a data restoration module 401. The data restoration module 401 may specifically include a clock recovery module 461, a clock recovery module 462, a PMD compensation module 471, a PMD compensation module 472, a carrier synchronization module 481, a carrier synchronization module 482, a decision module 491, and a decision module 492. The receiving device having the structure shown in FIG. 2C is different from the receiving device having the structure shown in FIG. 2B in that, the CD compensation modules are located at different positions. In the receiving device having the structure shown in FIG. 2C, the CD compensation module 441 is located before two IFFT sub-modules (451, 452), and performs CD compensation on the frequency domain signal output by the FFT module 431; the CD compensation module 442 is located before two IFFT sub-modules (453, 454), and performs CD compensation on the frequency domain signal output by the FFT module 432. Except for the above difference, other modules in the receiving device having the structure shown in FIG. 2C are the same as the corresponding modules in the receiving device having the structure shown in FIG. 2B, and details will not be described herein again. The FFT module 431, the FFT module 432, the CD compensation module 441, the CD compensation module 442, the IFFT sub-module 451, the IFFT sub-module 452, the IFFT sub-module 453, the IFFT sub-module 454 and the data restoration module 401 may all be implemented inside a DSP processor 400. It can be understood that, the DSP processor 400 is a part of the receiving device provided in this embodiment.

Figure 3A:
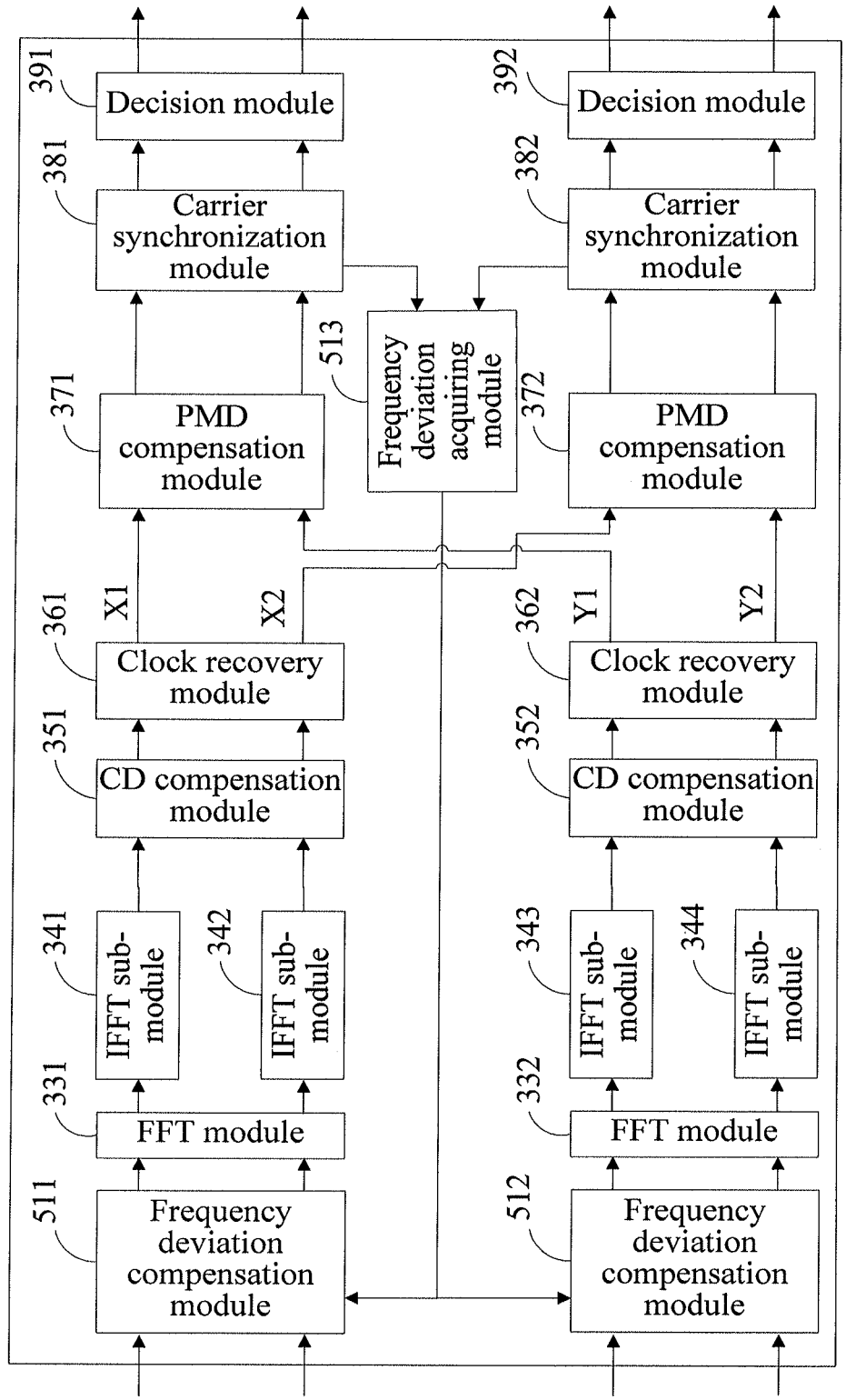
FIG. 3A is a first schematic structural diagram of a DSP processor provided in Embodiment 2 of the present invention.
Figure 3B:
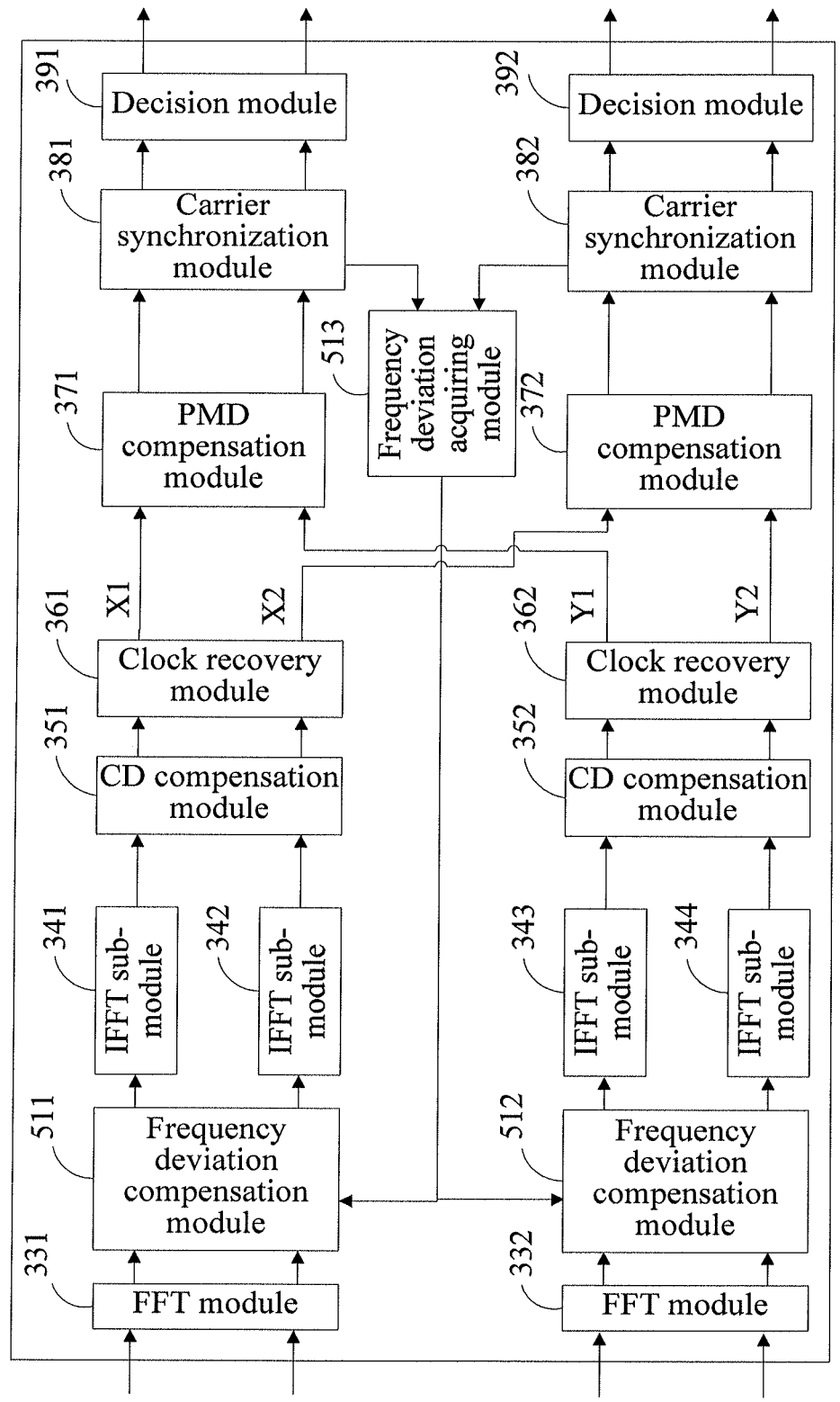
FIG. 3B is a second schematic structural diagram of a DSP processor provided in Embodiment 2 of the present invention.

In an embodiment, the DSP processor 300 in the receiving device having the structure shown in FIG. 2B may be replaced with a DSP processor having a structure shown in FIG. 3A. The DSP processor having the structure shown in FIG. 3A is different from the DSP processor 300 in the structure shown in FIG. 2B in that, a frequency deviation compensation module 511, a frequency deviation compensation module 512 and a frequency deviation acquiring module 513 are additionally provided, while other modules are the same as the corresponding modules in the DSP processor 300 in the structure shown in FIG. 2B. In this embodiment, the frequency deviation acquiring module 513 acquires a frequency deviation $\Delta\omega_1$ corresponding to the carrier 1 from the carrier synchronization module 381, and acquires a frequency deviation $\Delta\omega_2$ corresponding to the carrier 2 from the carrier synchronization module 382, calculates a frequency deviation compensation value $(\Delta\omega_1+\Delta\omega_2)/2$, and then provides the frequency deviation compensation value to the frequency deviation compensation module 511 and the frequency deviation compensation module 512. The frequency deviation compensation module 511 performs, based on the frequency deviation compensation value, frequency deviation compensation on a digital signal before the digital signal is input to the FFT module 331. The frequency deviation compensation module 512 performs, based on the frequency deviation compensation value, frequency deviation compensation on a digital signal before the digital signal is input to the FFT module 332. In another embodiment, the DSP processor having the structure shown in FIG. 3A may be replaced with a DSP processor having a structure shown in FIG. 3B. The DSP processor having the structure shown in FIG. 3B is only different from the DSP processor having the structure shown in FIG. 3A in that, the frequency deviation compensation module 511 and the frequency deviation compensation module 512 are located at different positions. In the DSP processor having the structure shown in FIG. 3B, the frequency deviation compensation module 511 is located before the IFFT sub-modules (341, 342), and performs frequency deviation compensation on the frequency domain signal output by the FFT module 331, and the frequency deviation compensation module 512 is located before the IFFT sub-modules (343, 344), and performs frequency deviation compensation on the frequency domain signal output by the FFT module 332.

Figure 4A:
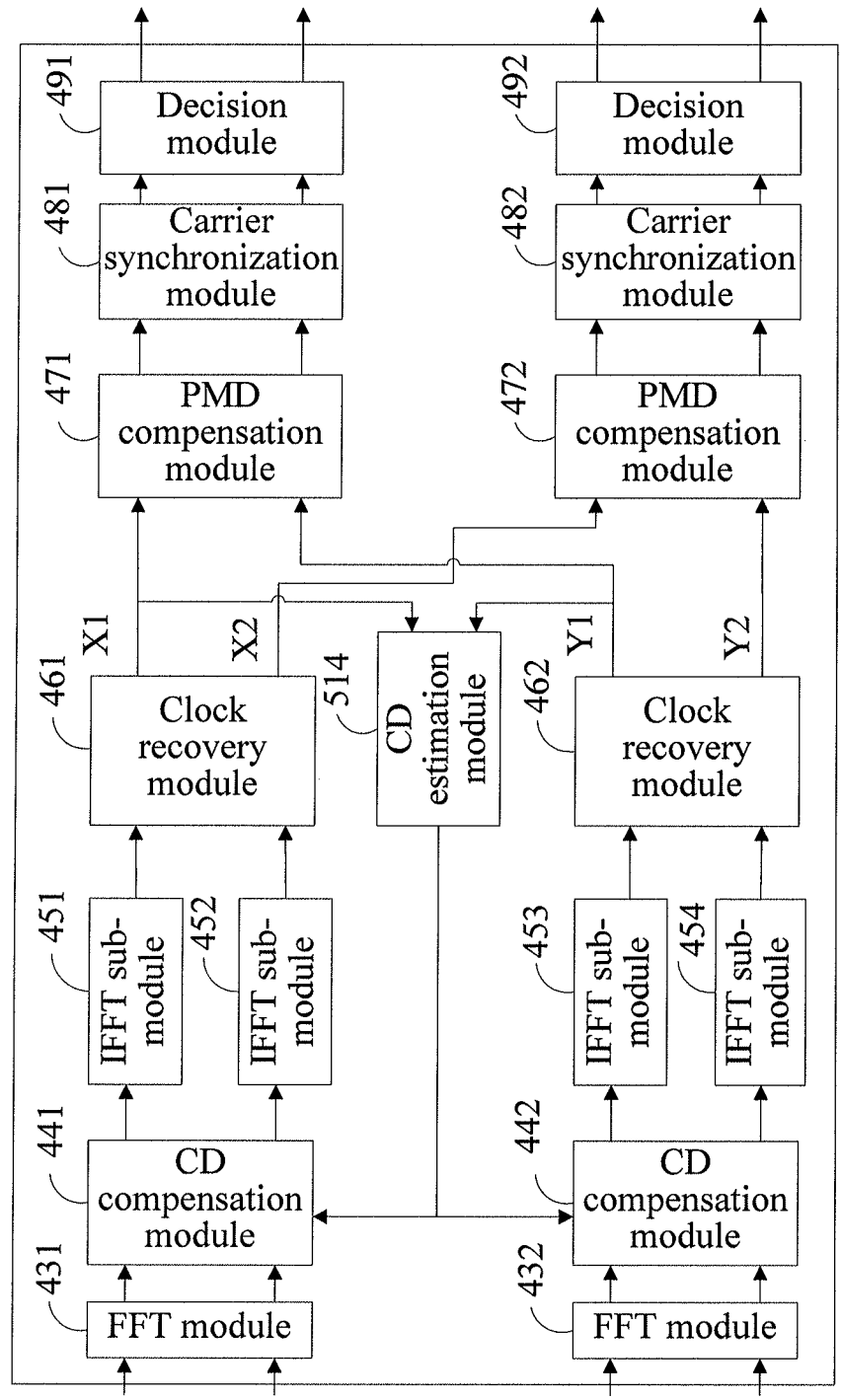
FIG. 4A is a third schematic structural diagram of a DSP processor provided in Embodiment 2 of the present invention.
Figure 4B:
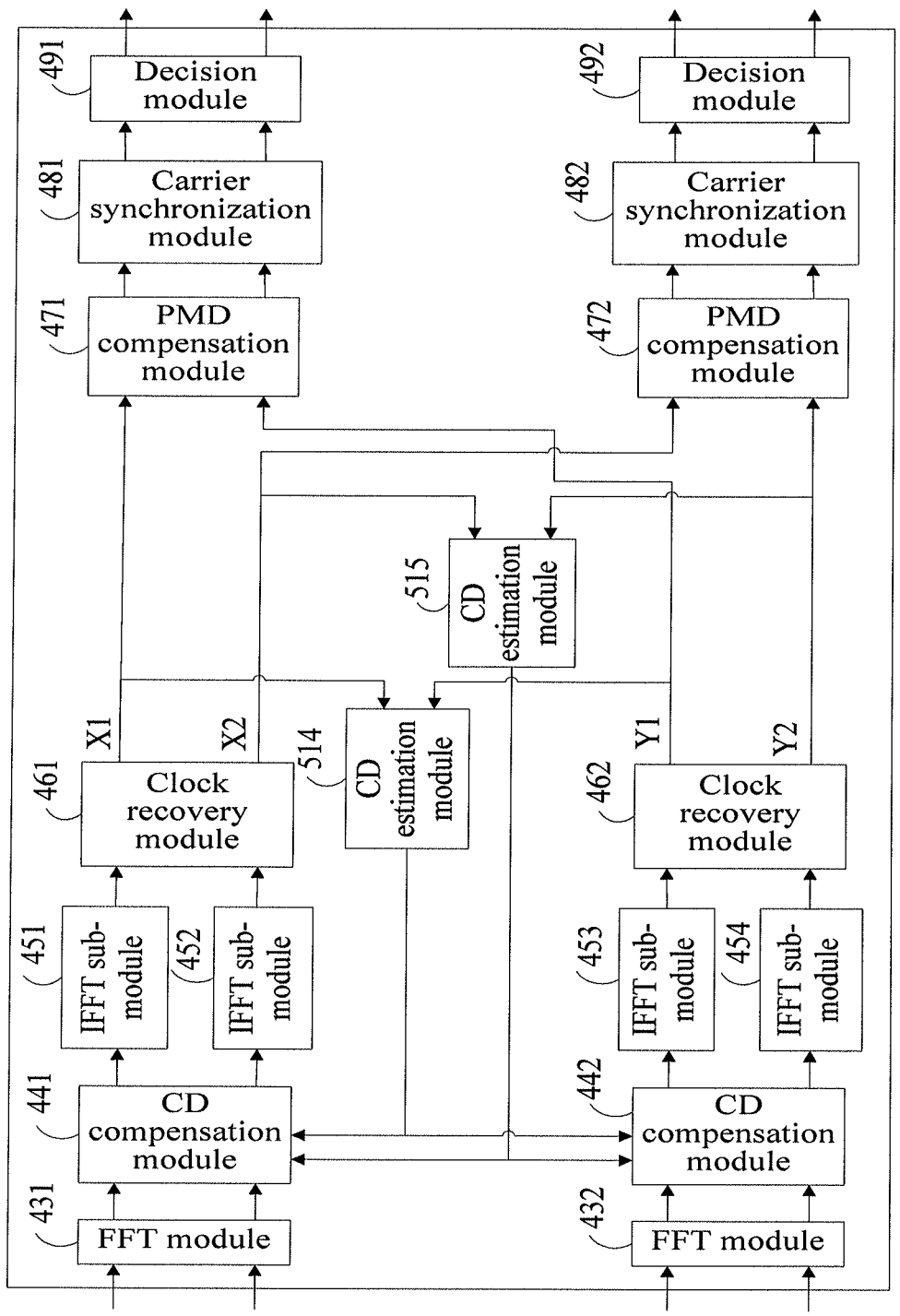
FIG. 4B is a fourth schematic structural diagram of a DSP processor provided in Embodiment 2 of the present invention.
Figure 4C:
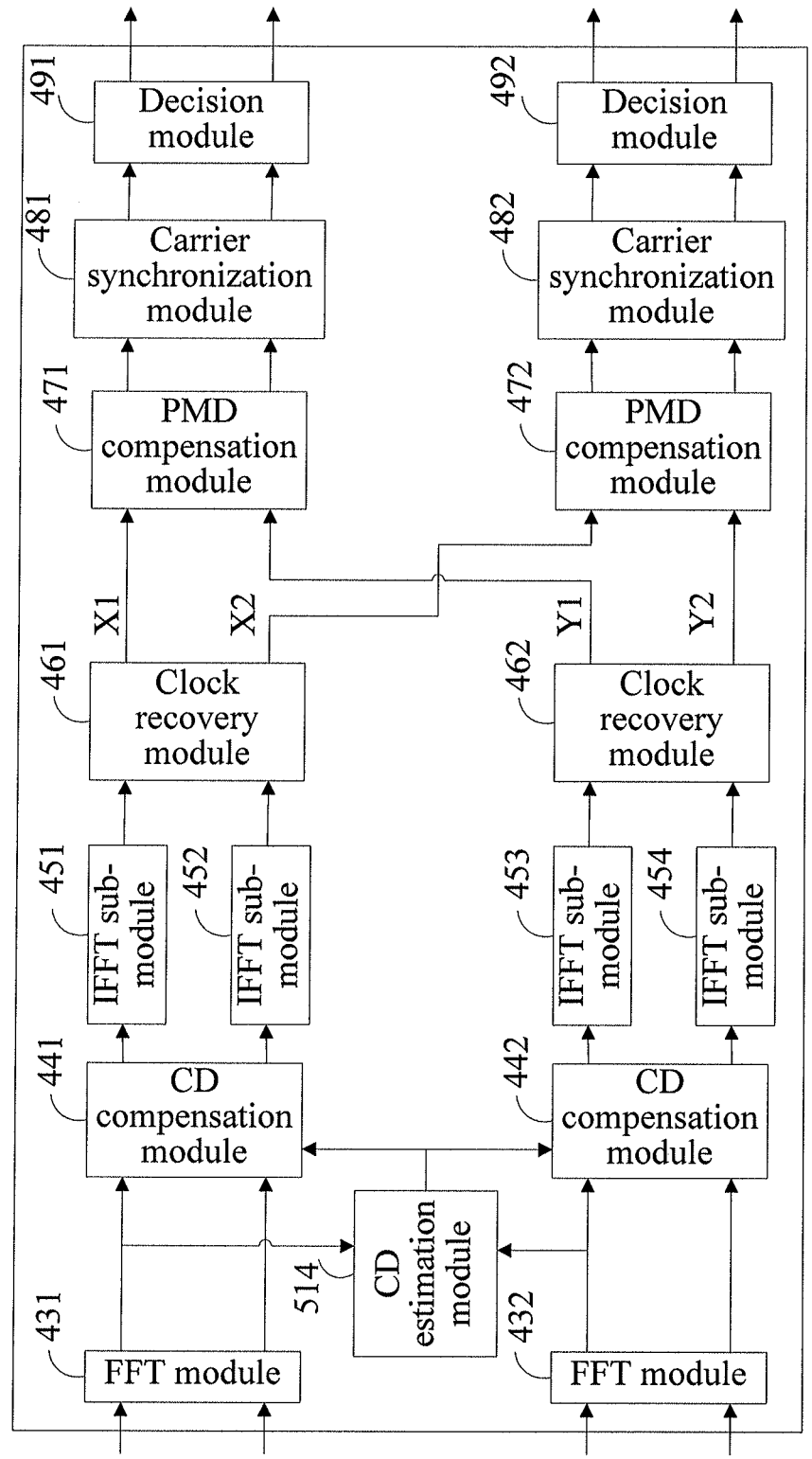
FIG. 4C is a fifth schematic structural diagram of a DSP processor provided in Embodiment 2 of the present invention.

In an embodiment, the DSP processor 400 in the receiving device having the structure shown in FIG. 2C may be replaced with a DSP processor having a structure shown in FIG. 4A. The DSP processor having the structure shown in FIG. 4A is different from the DSP processor 400 in the structure shown in FIG. 2C in that, the DSP processor having the structure shown in FIG. 4A further includes a CD estimation module 514 which estimates a CD value based on the time domain signals corresponding to the carrier 1 or the time domain signals corresponding to the carrier 2, and then provides the estimated CD value to the CD compensation module 441 and the CD compensation module 442. Without loss of generality, it is assumed that the CD estimation module estimates a CD value based on the time domain signals corresponding to the carrier 1, that is, estimates a CD value based on X1 and Y1. In another embodiment, the DSP processor having the structure shown in FIG. 4A may be replaced with a DSP processor having a structure shown in FIG. 4B. The DSP processor having the structure shown in FIG. 4B is different from the DSP processor having the structure shown in FIG. 4A in that, the DSP processor having the structure shown in FIG. 4B includes two CD estimation modules (514, 515), where the CD estimation module 514 estimates, based on the time domain signals corresponding to the carrier 1, a CD value corresponding to the carrier 1, and the CD estimation module 515 estimates, based on the time domain signals corresponding to the carrier 2, a CD value corresponding to the carrier 2. The CD estimation module 514 provides the estimated CD value corresponding to the carrier 1 to the CD compensation module 441 and the CD compensation module 442, and the CD estimation module 515 provides the estimated CD value corresponding to the carrier 2 to the CD compensation module 441 and the CD compensation module 442. In another embodiment, one CD compensation module is used to replace the CD compensation module 441 and the CD compensation module 442 in FIG. 4B, and the CD compensation module calculates, based on the time domain signals corresponding to the carrier 1, a CD value corresponding to the carrier 1, and estimates, based on the time domain signals corresponding to the carrier 2, a CD value corresponding to the carrier 2. In still another embodiment, one CD module may be adopted to estimate a CD value jointly based on the signals corresponding to the carrier 1 and the signals corresponding to the carrier 2, and then use the jointly estimated CD value as a basis for performing CD compensation on the carrier 1 and the carrier 2. In an embodiment, the DSP processor having the structure shown in FIG. 4A may be replaced with a DSP processor having a structure shown in FIG. 4C. The DSP processor having the structure shown in FIG. 4C is different from the processor having the structure shown in FIG. 4A in that, the CD estimation module 514 performs CD estimation on a part of frequency domain signals extracted from the frequency domain signals output by the FFT modules 431 and 432, and the CD estimation module 514 estimates a CD value corresponding to the carrier 1 based on the frequency domain signal corresponding to the carrier 1 in the frequency domain signals output by the FFT module 431 and the frequency domain signal corresponding to the carrier 1 in the frequency domain signals output by the FFT module 432. In an embodiment, the CD estimation module may estimate a CD value corresponding to the carrier 1 and a CD value corresponding to the carrier 2 based on all frequency domain signals corresponding to the carrier 1 and all frequency domain signals corresponding to the carrier 2, respectively. In still another embodiment, the CD estimation module may estimate a CD value jointly based on all frequency domain signals corresponding to the carrier 1 and all frequency domain signals corresponding to the carrier 2, and take the CD value as both the CD value corresponding to the carrier 1 and the CD value corresponding to the carrier 2.

In the DSP processors having the structures shown in FIG. 4A, FIG. 4B and FIG. 4C, the CD compensation module is located after the FFT module, and performs CD compensation on the frequency domain signal that is to be input to the IFFT sub-module; however, it can be understood that, the CD compensation module may also perform CD compensation on each time domain signal corresponding to its respective carrier, that is, the CD compensation module may be located after the IFFT module or after the clock recovery module, which is not specifically limited in the present invention.

All the devices for receiving a multi-carrier optical signal described in the foregoing embodiments include a CD compensation module and a PMD compensation module; however, it can be understood that, the CD compensation module and the PMD module are not necessarily a must. For example, when the CD corresponding to each carrier is small or the influence on system performance is slight, the receiving device may not need a CD compensation module. For another example, if the multi-carrier optical signal is not a polarization multiplexed optical signal, or the PMD corresponding to each carrier is small, the receiving device may not need a PMD compensation module.

When the multi-carrier optical signal is a non-polarization multiplexed multi-carrier optical signal, the quantity of the PD, the ADC, the FFT module, and the IFFT sub-module in the device for receiving a multi-carrier optical signal is half of the quantity of the corresponding components in the device for receiving a polarization multiplexed multi-carrier optical signal, respectively.

In the device for receiving a multi-carrier optical signal provided in the embodiment of the present invention, the multi-carrier optical signal is mixed with the local optical signal having the same center frequency as that of the multi-carrier optical signal, the signal obtained through the mixing is subjected to photoelectric conversion and analog-to-digital conversion processing in succession, the digital signal obtained through the analog-to-digital conversion is subjected to FFT processing, the signal obtained through the FFT processing is grouped, and each group is subjected to IFFT processing, to implement carrier separation, and finally data carried on each carrier is restored based on each time domain signal corresponding to its respective carrier. It can be seen from the above that, the device for receiving a multi-carrier optical signal provided in the embodiment of the present invention only requires one set of coherent reception device, and therefore the receiving device has low cost and low power consumption, and is easy to implement; furthermore, all processing after the analog-to-digital conversion may be completed inside one component (for example, DSP), which facilitates the sharing and exchange of channel information and parameters between the carriers, thereby reducing the complexity of receiving the multi-carrier optical signal, and optimizing the performance of the receiving device.

Figure 5:
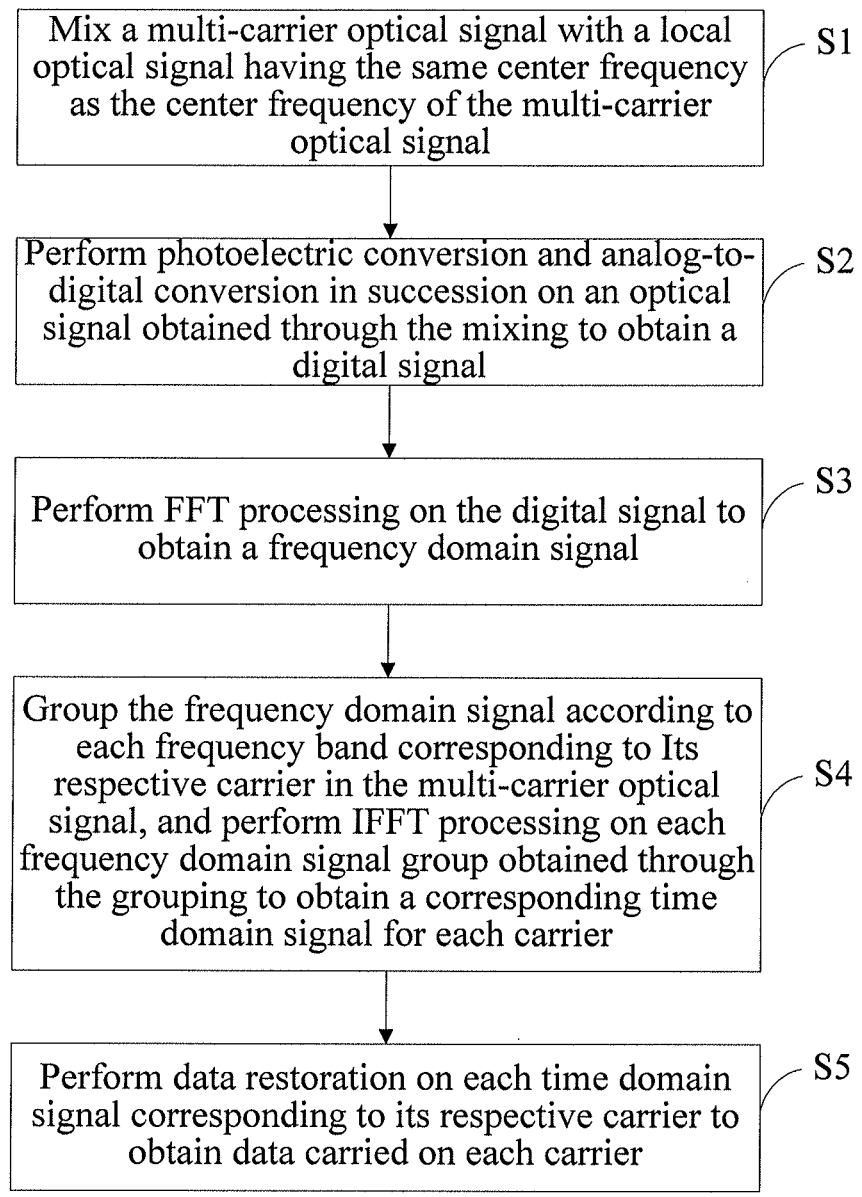
FIG. 5 is a flow chart of a method for receiving a multi-carrier optical signal provided in Embodiment 3 of the present invention.

Corresponding to the device for receiving a multi-carrier optical signal described above, an embodiment of the present invention further provides a method for receiving a multi-carrier optical signal, and the method has a flow shown in FIG. 5, and includes the following steps.

Step S1: Mix a multi-carrier optical signal with a local optical signal having the same center frequency as that of the multi-carrier optical signal. In the present invention, a dual-carrier optical signal having two carriers also belongs to the multi-carrier optical signal described in the present invention, and the modulation mode corresponding to one carrier in the multi-carrier optical signal may be different from the modulation mode corresponding to another carrier.

For ease of description, "N-carrier optical signal" is described as the substitute of "multi-carrier optical signal", where $N \geq 2$. The center frequency points of the N carriers in the N-carrier optical signal are $f1, f2, \ldots,$ and $fN$, and the center frequency $fS0$ of the N-carrier optical signal is $(f1+f2+ \ldots +fN)/N$. In the embodiment of the present invention, the center frequency $f0$ of the local optical signal is specifically the center frequency $fS0$ of the N-carrier optical signal. However, in some actual applications, the center frequency $f0$ of the local optical signal that may be adopted is not completely equal to $fS0$, but slightly deviates from $fS0$, or changes around $fS0$. It can be understood that, the present invention can also be implemented by adopting the local optical signal having the center frequency in the above cases, and therefore, even when the center frequency of the local optical signal slightly deviates from $fS0$ or changes around $fS0$, the center frequency of the local optical signal should also be considered as the center frequency of the N-carrier optical signal.

Step S2: Perform photoelectric conversion and analog-to-digital conversion in succession on an optical signal obtained through the mixing to obtain a digital signal. In specific implementation, a PD and an ADC may be adopted to perform photoelectric conversion and analog-to-digital conversion in succession on the optical signal obtained through the mixing.

Step S3: Perform FFT processing on the digital signal to obtain a frequency domain signal. Each carrier of the multi-carrier optical signal occupies a frequency band, the signal before the FFT processing is the time domain representation of the multi-carrier optical signal, the frequency domain signal obtained by the FFT processing is the frequency domain representation of the multi-carrier optical signal, and the frequency domain signal is formed by discrete frequency points. As the frequency band occupied by each carrier corresponds to a part of frequency points in the frequency domain signal, there is an inherent correspondence between the frequency points in the frequency domain signal and each frequency band corresponding to its respective carrier in the multi-carrier optical signal.

Step S4: Group the frequency domain signal according to a frequency band corresponding to each carrier in the multi-carrier optical signal, and perform IFFT processing on each frequency domain signal group obtained through the grouping to obtain a corresponding time domain signal for each carrier. In this step, the frequency domain signal may be grouped based on each frequency band corresponding to its respective carrier, and the grouping method is: taking all frequency points corresponding to the frequency band occupied by a specific carrier in the frequency domain signal as a group. Then, each frequency domain signal group obtained through the grouping separately undergoes IFFT processing, to obtain a corresponding time domain signal for each of the N carriers, that is, carrier separation is achieved.

Step S5: Perform data restoration on each time domain signal corresponding to its respective carrier to obtain data carried on each carrier.

In an embodiment, step S5 may specifically include:

performing clock timing synchronization, carrier synchronization and decision in succession on each time domain signal corresponding to its respective carrier, where data obtained through the decision is data carried on each carrier.

Further, step S5 may include PMD compensation processing, which is specifically: before the carrier synchronization processing, performing PMD compensation on each time domain signal that corresponds to its respective carrier and needs to undergo carrier synchronization processing, and using each signal corresponding to its repective carrier after the PMD compensation processing as the input of the carrier synchronization processing.

In another embodiment, the receiving method provided in the embodiment of the present invention may further include:

before performing the IFFT processing on each frequency domain signal group obtained through the grouping to obtain the time domain signal corresponding to its respective carrier, performing chromatic dispersion CD compensation on the frequency domain signal. The CD compensation may be performed on the frequency domain signal according to a preset CD compensation value, or, according to a CD value obtained by performing CD value monitoring on the received multi-carrier optical signal. In a specific embodiment, the latter CD compensation manner may specifically include: estimating a CD value based on the time domain signal corresponding to an arbitrary carrier, and performing the CD compensation on the frequency domain signal according to the estimated CD value; or, estimating a CD value jointly based on at least two the time domain signals corresponding to their respective carriers in the carriers, and performing the CD compensation on the frequency domain signal according to the jointly estimated CD value; or, estimating a CD value based on each time domain signal corresponding to its respective carrier to obtain a corresponding CD value for each carrier, and performing the CD compensation on each frequency domain signal corresponding to its respective carrier, according to the CD value corresponding to the same carrier; or, estimating a CD value corresponding to an arbitrary carrier based on the frequency domain signal, and performing the CD compensation on the frequency domain signal according to the estimated CD value; or, estimating a corresponding CD value for each carrier based on the frequency domain signal, and performing the CD compensation on the frequency domain signal according to the estimated CD value corresponding to each carrier.

In still another embodiment, the receiving method provided in the embodiment of the present invention may further include:

after the performing the IFFT processing on each frequency domain signal group obtained through the grouping to obtain a corresponding time domain signal for each carrier, performing CD compensation on each time domain signal corresponding to its respective carrier. The CD compensation may also be performed on the frequency domain signal according to a CD value obtained by performing CD value monitoring on the received multi-carrier optical signal. In a specific embodiment, the latter CD compensation manner may specifically include: estimating a CD value based on the time domain signal corresponding to an arbitrary carrier, and performing the CD compensation on each time domain signal corresponding to its respective carrier according to the estimated CD value; or, estimating a CD value jointly based on at least two time domain signals corresponding to their respective carriers, and performing the CD compensation on each time domain signal corresponding to its respective carrier according to the jointly estimated CD value; or, estimating a CD value based on each time domain signal corresponding to its respective carrier to obtain a corresponding CD value for each carrier, and performing the CD compensation on each time domain signal corresponding to its respective carrier according to the CD value corresponding to the carrier; or, estimating a CD value corresponding to one of the carriers based on the frequency domain signal, and performing the CD compensation on each time domain signal corresponding to its respective carrier according to the estimated CD value; or, estimating a corresponding CD value for each carrier based on the frequency domain signal, and performing the CD compensation on each time domain signal corresponding to its respective carrier according to the CD value corresponding to the carrier.

In another embodiment, the receiving method provided in the embodiment of the present invention may further include:

before the performing the FFT processing on the digital signal to obtain the frequency domain signal, performing frequency deviation compensation on the digital signal based on the estimated frequency deviation values of the carriers acquired during the carrier synchronization processing; or, before performing the IFFT processing on each frequency domain signal group obtained through the grouping to obtain a corresponding time domain signal for each carrier, performing frequency deviation compensation on the frequency domain signal based on an estimated frequency deviation value of the carriers acquired during the carrier synchronization processing.

In the method for receiving a multi-carrier optical signal provided in the embodiment of the present invention, the multi-carrier optical signal is mixed with the local optical signal having the same center frequency as that of the multi-carrier optical signal, the signal obtained through the mixing is subjected to photoelectric conversion and analog-to-digital conversion processing in succession, the digital signal obtained through the analog-to-digital conversion is subjected to FFT processing, the signal obtained through the FFT processing is grouped, and each group is subjected to IFFT processing, to implement carrier separation, and finally data carried on each carrier is restored based on each time domain signal corresponding to its respective carrier. It can be seen from the above that, the method for receiving a multi-carrier optical signal provided in the embodiments of the present invention only requires one set of coherent reception device during implementation, and therefore the receiving method is easy to implement at low cost; and all processing after the analog-to-digital conversion may be completed inside one component (for example, DSP), which facilitates the sharing and exchange of channel information and parameters between the carriers, thereby reducing the complexity of receiving the multi-carrier optical signal.

Persons of ordinary skill in the art should understand that all or part of the steps in the method of the embodiments may be implemented through a program instructing related hardware. The program may be stored in a computer readable storage medium. The storage medium may include a read only memory, a random access memory, a magnetic disk or an optical disk.

The above descriptions are merely exemplary embodiments of the present invention, but the protection scope of the present invention is not limited thereto. Any change or replacement that can be easily thought of by persons skilled in the art within the technical scope disclosed in the present invention shall fall within the protection scope of the present invention. Therefore, the protection scope of the present invention shall be subject to the protection scope of the claims.

What is claimed is:

1. A method for receiving a multi-carrier optical signal, comprising:

mixing a multi-carrier optical signal with a local optical signal having a same center frequency as the center frequency of the multi-carrier optical signal;

performing photoelectric conversion and analog-to-digital conversion in succession on an optical signal obtained through the mixing to obtain a digital signal wherein the digital signal is converted from an electrical signal and the electrical signal is converted from the mixed optical signal that is from the multi-carrier optical signal mixed with the local optical signal having the same center frequency as the center frequency of the multi-carrier optical signal, wherein the center frequency of the multi-carrier optical signal is an average of frequencies of multiple carriers for the multi-carrier optical signal, and the local optical signal adopted for mixing having the central frequency of the local optical signal being offset from the center frequency of the multi-carrier optical signal, wherein the central frequency of the local optical signal from the center frequency of the multi-carrier optical signal being in a range that produces an electrical signal by the photoelectric conversion after the mixing of the multi-carrier optical signal with the local optical signal;

performing fast Fourier transform FFT on the digital signal to obtain a frequency domain signal;

grouping the frequency domain signal according to each frequency band corresponding to its respective carrier in the multi-carrier optical signal wherein the frequency domain signal is a frequency domain representation of the multi-carrier optical signal, and performing inverse fast Fourier transform IFFT on each frequency domain signal group obtained through the grouping to obtain a corresponding time domain signal for each carrier; and performing data restoration on each time domain signal corresponding to its respective carrier to obtain data carried on each carrier.

2. The method according to claim 1, wherein the performing the data restoration on each time domain signal corresponding to its respective carrier comprises:

performing clock timing synchronization, carrier synchronization and decision processing in succession on each time domain signal corresponding to its respective carrier.

3. The method according to claim 2, wherein the performing the data restoration on each time domain signal corresponding to its respective carrier further comprises: before the carrier synchronization processing, performing polarization mode dispersion compensation on each time domain signal which corresponds to its respective carrier to get an output signal, and using the output signal as an input of the carrier synchronization processing.

4. The method according to claim 1, further comprising: before the performing the IFFT on each frequency domain signal group obtained through the grouping to obtain a corresponding time domain signal for each carrier, performing chromatic dispersion CD compensation on the frequency domain signal.

5. The method according to claim 4, wherein the performing CD compensation on the frequency domain signal specifically comprises one step of group consisting of step A, step B, step C, step D and step E, wherein step A comprises estimating a first CD value based on a time domain signal corresponding to an arbitrary carrier, and performing CD compensation on the frequency domain signal according to the first CD value;

wherein step B comprises jointly estimating a second CD value based on at least two time domain signals corresponding to their respective carriers, and performing CD compensation on the frequency domain signal according to the second CD value;

wherein step C comprises estimating a third CD value for each carrier based on each time domain signal corresponding to its respective carrier, and performing CD compensation on each frequency domain signal corresponding to its respective carrier, according to a third CD value corresponding to the same carrier;

wherein step D comprises estimating a fourth CD value corresponding to an arbitrary carrier based on the frequency domain signal obtained through the fast Fourier transform, and performing CD compensation on the frequency domain signal according to the fourth CD value;

wherein step E comprises estimating a fifth CD value for each carrier based on the frequency domain signal obtained through the fast Fourier transform, and performing CD compensation on the frequency domain signal according to the fifth CD values corresponding to their respective carriers.

6. The method according to claim 1, further comprising: after the performing inverse fast Fourier transform IFFT on each frequency domain signal group obtained through the grouping to obtain a corresponding time domain signal for each carrier, performing CD compensation on each time domain signal corresponding to its respective carrier.

7. The method according to claim 6, wherein the performing CD compensation on the frequency domain signal specifically comprises one step of group consisting of step F, step G, step H, step I and step J, wherein step F comprises estimating a first CD value based on a time domain signal corresponding to an arbitrary carrier, and performing CD compensation on each time domain signal corresponding to its respective carrier, according to the first CD value;

wherein step G comprises jointly estimating a second CD value based on at least two time domain signals corresponding to their respective carriers, and performing CD compensation on each time domain signal corresponding to its respective carrier, according to the second CD value;

wherein step H comprises estimating a third CD value for each carrier based on each time domain signal corresponding to its respective carrier, and performing CD compensation on each time domain signal corresponding to its respective carrier, according to a third CD value corresponding to the same carrier;

wherein step I comprises the step of estimating a fourth CD value corresponding to a carrier based on the frequency domain signal obtained through the fast Fourier transform, and performing CD compensation on each time domain signal corresponding to its respective carrier, according to the fourth CD value;

wherein step J comprises the step of estimating a fifth CD value for each carrier based on the frequency domain signal obtained through the fast Fourier transform, and performing CD compensation on each time domain signal corresponding to its respective carrier, according to a fifth CD value corresponding to the same carrier.

8. The method according to claim 2, further comprising: before the performing the fast Fourier transform FFT on the digital signal to obtain the frequency domain signal, performing frequency deviation compensation on the digital signal based on each estimated frequency deviation value which corresponds to its respective carrier and is obtained during the carrier synchronization processing.

9. The method according to claim 2, further comprising:
before the performing inverse fast Fourier transform IFFT on each frequency domain signal group obtained through the grouping to obtain a corresponding time domain signal for each carrier, performing frequency deviation compensation on the frequency domain signal based on each estimated frequency deviation value which corresponds to its respective carrier and is obtained during the carrier synchronization processing.

10. A device for receiving a multi-carrier optical signal, comprising:
a mixer, configured to receive a multi-carrier optical signal and a local optical signal having the same center frequency as the center frequency of the multi-carrier optical signal, and mix the multi-carrier optical signal with the local optical signal;
a photoelectric conversion module, configured to perform photoelectric conversion on an optical signal output by the mixer to obtain an electrical signal;
an analog-to-digital conversion module, configured to perform analog-to-digital conversion on the electrical signal to obtain a digital signal, wherein the electrical signal is converted by the photoelectric conversion module from the optical signal output by the mixer to mix the multi-carrier optical signal with a local optical signal having the same center frequency as the center frequency of the multi-carrier optical signal, wherein the center frequency of the multi-carrier optical signal is an average of frequencies of multiple carriers for the multi-carrier optical signal, and the local optical signal adopted for mixing having the central frequency of the local optical signal being offset from the center frequency of the multi-carrier optical signal, wherein the central frequency of the local optical signal from the center frequency of the multi-carrier optical signal being in a range that produces an electrical signal by the photoelectric conversion after the mixing of the multi-carrier optical signal with the local optical signal;
a fast Fourier transform FFT module, configured to perform FFT processing on the digital signal to obtain a frequency domain signal;
an inverse fast Fourier transform IFFT module, configured to group the frequency domain signal according to each frequency band corresponding to its respective carrier in the multi-carrier optical signal wherein the frequency domain signal is a frequency domain representation of the multi-carrier optical signal, and performing inverse fast Fourier transform IFFT on each frequency domain signal group obtained through the grouping to obtain a corresponding time domain signal for each carrier; and
a data restoration module, configured to perform data restoration on each time domain signal corresponding to its respective carrier to obtain data carried on each carrier.

11. The device according to claim 10, wherein the data restoration module comprises:
a clock recovery module, configured to perform clock timing synchronization processing on each time domain signal corresponding to its respective carrier;
a carrier synchronization module, configured to perform carrier synchronization processing on each time domain signal which corresponds to its respective carrier and has undergone the clock timing synchronization processing; and a decision module, configured to make a decision on each time domain signal which corresponds to its respective carrier and has undergone the carrier synchronization processing, to obtain the data carried on each carrier.

12. The device according to claim 10, further comprising a chromatic dispersion CD compensation module, wherein
the CD compensation module is configured to perform CD compensation on the frequency domain signal before the frequency domain signal output by the FFT module is input to the IFFT module; or,
the CD compensation module is configured to perform CD compensation on each time domain signal that corresponds to its respective carrier and is output by the IFFT module.

13. The device according to claim 12, further comprising one module of group consisting of module K, module L, module M, module N and module O, wherein
module K is a first CD estimation module, configured to estimate a first CD value based on a time domain signal corresponding to an arbitrary carrier, and provide the first CD value to the CD compensation module as a basis for the CD compensation module to perform CD compensation;
wherein module L is a second CD estimation module, configured to jointly estimate a second CD value based on at least two time domain signals corresponding to their respective carriers, and provide the second CD value to the CD compensation module as a basis for the CD compensation module to perform CD compensation;
wherein module M is a third CD estimation module, configured to estimate, based on each time domain signal corresponding to its respective carrier, to obtain a third CD value for each carrier, and provide the third CD values corresponding to their respective carriers to the CD compensation module as a basis for the CD compensation module to perform CD compensation;
wherein module N is a fourth CD estimation module, configured to estimate a fourth CD value corresponding to an arbitrary carrier based on the frequency domain signal output by the FFT module, and provide the fourth CD value to the CD compensation module as a basis for the CD compensation module to perform CD compensation;
wherein module O is a fifth CD estimation module, configured to estimate a fifth CD value for each carrier based on the frequency domain signal output by the FFT module, and provide the fifth CD values corresponding to their respective carriers to the CD compensation module as a basis for the CD compensation module to perform CD compensation.

14. The device according to of claim 11, wherein the data restoration module further comprises a polarization mode dispersion compensation module, configured to perform polarization mode dispersion compensation on each time domain signal which corresponds to its respective carrier and has undergone the clock timing synchronization processing, before the time domain signals which correspond to their respective carriers and have undergone the clock timing synchronization processing are input to the carrier synchronization module.

15. The device according to claim 11, further comprising a frequency deviation acquiring module and a frequency deviation compensation module, wherein
the frequency deviation acquiring module is configured to acquire a corresponding frequency deviation value for each carrier, where the corresponding frequency deviation value is obtained when the carrier synchronization module performs the carrier synchronization processing, calculate a frequency deviation compensation value based on the acquired corresponding frequency deviation values corresponding to their respective carrier, and provide the frequency deviation compensation value to the frequency deviation compensation module; and the frequency deviation compensation module is configured to perform frequency deviation compensation on the digital signal based on the frequency deviation compensation value, before the digital signal is input to the FFT module; or, the frequency deviation compensation module is configured to perform frequency deviation compensation on the frequency domain signal based on the frequency deviation compensation value, before the frequency domain signal is input to the IFFT module.

16. A method for receiving a multi-carrier optical signal, comprising:

mixing a multi-carrier optical signal with a local optical signal having a same center frequency as the center frequency of the multi-carrier optical signal, wherein the center frequency of the multi-carrier optical signal is the average value of the center frequencies of multiple carrier signals in the multi-carrier optical signal, and the local optical signal adopted for mixing having the central frequency of the local optical signal being offset from the center frequency of the multi-carrier optical signal, wherein the central frequency of the local optical signal from the center frequency of the multi-carrier optical signal being in a range that produces an electrical signal by the photoelectric conversion after the mixing of the multi-carrier optical signal with the local optical signal;

performing photoelectric conversion and analog-to-digital conversion in succession on an optical signal obtained through the mixing to obtain a digital signal;

performing fast Fourier transform FFT on the digital signal to obtain a frequency domain signal;

grouping the frequency domain signal according to each frequency band corresponding to its respective carrier in the multi-carrier optical signal, wherein a frequency domain signal group is formed by all frequency points corresponding to a same frequency band in the frequency domain; wherein the frequency domain signal is a frequency domain representation of the multi-carrier optical signal, and performing inverse fast Fourier transform IFFT on each frequency domain signal group obtained through the grouping to obtain a corresponding time domain signal for each carrier; and performing data restoration on each time domain signal corresponding to its respective carrier to obtain data carried on each carrier.

17. The method according to claim 16, wherein the frequency domain signal is formed by discrete frequency points, wherein each frequency band occupied by each carrier corresponds to part of frequency points in the frequency domain signal.

18. The method according to claim 16, wherein the performing the data restoration on each time domain signal corresponding to its respective carrier comprises:

performing clock timing synchronization, carrier synchronization and decision processing in succession on each time domain signal corresponding to its respective carrier.

19. The method according to claim 16, wherein the performing the data restoration on each time domain signal corresponding to its respective carrier further comprises: before the carrier synchronization processing, performing polarization mode dispersion compensation on each time domain signal which corresponds to its respective carrier to get an output signal, and using the output signal as an input of the carrier synchronization processing.

20. The method according to claim 16, further comprising:

before the performing the IFFT on each frequency domain signal group obtained through the grouping to obtain a corresponding time domain signal for each carrier, performing chromatic dispersion CD compensation on the frequency domain signal.

* * * * *